(12) United States Patent
Stephenne et al.

(10) Patent No.: US 11,589,361 B2
(45) Date of Patent: Feb. 21, 2023

(54) UPLINK-DOWNLINK CO-SCHEDULING WITH BEAM CONTROL AND PASSIVE INTERMODULATION AWARENESS

(71) Applicant: Telefonaktiebolaget LM Ericsson (publ), Stockholm (SE)

(72) Inventors: Alex Stephenne, Stittsville (CA); Pierre-Andre Laporte, Gatineau (CA); Mark William Wyville, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 27 days.

(21) Appl. No.: 17/050,001

(22) PCT Filed: May 16, 2018

(86) PCT No.: PCT/IB2018/053442
§ 371 (c)(1),
(2) Date: Oct. 23, 2020

(87) PCT Pub. No.: WO2019/220179
PCT Pub. Date: Nov. 21, 2019

(65) Prior Publication Data
US 2021/0185692 A1  Jun. 17, 2021

(51) Int. Cl.
*H04W 72/08*  (2009.01)
*H04B 7/06*  (2006.01)
(Continued)

(52) U.S. Cl.
CPC ........ *H04W 72/082* (2013.01); *H04B 7/0617* (2013.01); *H04B 7/086* (2013.01); *H04W 72/1263* (2013.01)

(58) Field of Classification Search
CPC ............ H04W 72/082; H04W 72/1263; H04B 7/0617; H04B 7/086
(Continued)

(56) References Cited

U.S. PATENT DOCUMENTS

2013/0194984 A1  8/2013  Cheng et al.
2015/0092621 A1  4/2015  Jalloul et al.
(Continued)

FOREIGN PATENT DOCUMENTS

EP  3301818 A1 *  4/2018  ............... H04B 1/10
EP  3331169 A1 *  6/2018  ............ H04W 74/04
(Continued)

OTHER PUBLICATIONS

3GPP TR 37.808 V12.0.0 (Year: 2013).*
(Continued)

*Primary Examiner* — Intekhaab A Siddiquee
(74) *Attorney, Agent, or Firm* — Sage Patent Group

(57) ABSTRACT

A first radio node for uplink and downlink co-scheduling is provided. The first radio node includes processing circuitry containing instructions executable to configure the first radio node to: determine a scheduling restriction for joint uplink and downlink scheduling based on passive intermodulation (PIM) generated during simultaneous uplink and downlink communications where the uplink communications corresponds to communications from a second radio node to the first radio node, and perform communications according to the scheduling restriction.

15 Claims, 6 Drawing Sheets

(51) Int. Cl.
  *H04B 7/08* (2006.01)
  *H04W 72/12* (2009.01)
  *H04W 72/1263* (2023.01)
(58) Field of Classification Search
  USPC .......................................................... 370/329
  See application file for complete search history.

(56) References Cited

U.S. PATENT DOCUMENTS

2018/0295617 A1* 10/2018 Abdelmonem ... H04W 28/0236
2020/0145079 A1* 5/2020 Marinier .............. H04B 7/0456

FOREIGN PATENT DOCUMENTS

| EP | 3331169 A1 | 6/2018 | |
|---|---|---|---|
| EP | 3129797 B1 * | 7/2018 | ............. G01R 29/10 |
| WO | 2015027481 A1 | 3/2015 | |
| WO | WO-2015027481 A * | 3/2015 | ........ H04W 72/1226 |
| WO | 2017035742 A1 | 3/2017 | |
| WO | 2017157461 A1 | 9/2017 | |

OTHER PUBLICATIONS

PCT International Search Report and Written Opinion dated Feb. 12, 2019 for International Application No. PCT/IB2018/053442, 21 pages.

* cited by examiner

UPLINK-DOWNLINK CO-SCHEDULING WITH BEAM CONTROL AND PASSIVE INTERMODULATION AWARENESS

CROSS-REFERENCE TO RELATED APPLICATIONS

This application is a 35 U.S.C. § 371 national stage application for International Application No. PCT/IB2018/053442, entitled "UPLINK-DOWNLINK CO-SCHEDULING WITH BEAM CONTROL AND PASSIVE INTERMODULATION AWARENESS", filed on May 16, 2018, the disclosures and contents of which are hereby incorporated by reference in their entireties.

TECHNICAL FIELD

Wireless communication and in particular, to providing scheduling restrictions based on passive intermodulation awareness.

BACKGROUND

External passive intermodulation (PIM) may occur when one or multiple base station/first radio node antennas transmit one or multiple signals in one or multiple frequencies, and those signals interact in a non-linear manner with a structure in a propagation environment. This interaction may generate an interfering signal, at a possibly different frequency from the transmitted frequency(ies), which may radiate out of the passive PIM source (referred to as PIM source). This process may be referred to as the "rusty bolt" effect due to junctions of different materials/metals such as the un-rusted bolt portion and the rusted bolt portion that may cause PIM. In other words, in some examples, the mechanical components of the wireless communication system itself, such as rusty bolts, may become PIM sources, although other structures in the propagation environment may also become PIM sources. These PIM sources may generate interfering signal(s) that may interfere with reception of an intended wireless signal at a receiver such as a first radio node receiver. One existing manner of handling external PIM is to detect that a PIM problem exists, and to send a highly skilled technician to an antenna site to clean the antenna site to make sure that any "rusty bolt" or other component that might contribute to PIM is removed, repaired, tightened and/or replaced. This approach is very costly.

Further, when the number of antennas involved in the PIM generation is relatively small, it may be computationally feasible to attempt to reconstruct an estimated interfering PIM signal such as by using an estimated PIM channel and known transmitted signals. PIM interference cancellation may then be performed using the reconstructed estimated interfering PIM signal. However, when a quantity of antennas is too high, the numerical complexity becomes too high such as to render estimated interfering PIM reconstruction impractical and/or unfeasible, hence rendering this manner of PIM interference cancellation unfeasible.

SUMMARY

Some embodiments advantageously provide a method and system for uplink and downlink co-scheduling based on PIM awareness such as to at least in part mitigate PIM.

Wireless communications systems may use a large number of antennas for transmission and reception on the network side such as at the first radio node where passive intermodulation (PIM) avoidance may become desired as PIM cancellation may become unfeasible. These wireless communications systems with large number of antennas for transmission/reception (TX/RX) may be referred to as advanced antenna systems (AAS). However, when a quantity of antennas is too high, the numerical complexity becomes too high such as to render the process of estimating interfering PIM reconstruction unfeasible, hence render this manner of PIM interference cancellation unfeasible. For example, the complexity of traditional time domain PIM cancellation techniques becomes impractical when the number of downlink antennas is larger than four. Therefore, PIM avoidance may be explored instead or in addition to partial PIM cancellation. PIM avoidance may generally relate to attempting to avoid PIM generation and/or reception as opposed to at least partial PIM cancellation of a received PIM interference.

The teachings of the disclosure advantageously exploit transmission and/or reception directivity provided by advanced antenna systems (AAS) to help at least in part mitigate passive intermodulation issues. In other words, as site clean-up to remove PIM sources such as rusty bolts is costly, the teachings of the disclosure teach that the "rusty bolt" effect can be mitigated when a first radio node or cell site uses advanced antenna systems, so that site clean-up can be scheduled much less frequently. For example, site cleanup may be considered an option only when PIM sources correspond to signal angle of arrival and departures which may be difficult to manage (as could be the case if the PIM source location coincides with receive/transmission angles frequently mapped to the location of the intended second radio nodes.

In some examples, the process described herein may use a learning phase for which the system may record the downlink beam steering directions and the corresponding uplink beam steering directions for which a large PIM component is present. Once a look-up-table of angles of departure and angles of arrival, for specific band combinations, is populated based on these beam steering directions, the table may be used to schedule uplink and downlink communication layers for second radio nodes in such a way as to help avoid the "bad" directional combination where PIM interference is being generated and/or received. In some examples, the used directivity patterns may be modified and restricted to mitigate the PIM impact such as if a "bad" direction combination is not avoidable.

According to one aspect of the disclosure, a first radio node for uplink and downlink co-scheduling is provided. The first radio node includes processing circuitry containing instructions executable to configure the first radio node to: determine a scheduling restriction for joint uplink and downlink scheduling based on passive intermodulation, PIM, generated during simultaneous uplink and downlink communications where the uplink communications corresponds to communications from a second radio node to the first radio node, and perform communications according to the scheduling restriction.

According to one embodiment of this aspect, the memory contains further instructions executable by the processor to determine information about the PIM generated during simultaneous uplink and downlink communication. According to another embodiment of this aspect, the PIM information includes at least one PIM metric for at least one combination of at least one uplink angle of arrival and at least one downlink angle of departure. According to another embodiment of this aspect, the scheduling restriction is applied to an uplink scheduling of the joint uplink and downlink scheduling, and is based on PIM generated during downlink communications.

According to another embodiment of this aspect, the scheduling restriction is configured to correspond to a mapping of at least one uplink PIM interference direction generated during downlink communications to a null portion of an uplink reception radiation pattern. According to another embodiment of this aspect, the scheduling restriction is configured to correspond to a mapping of a plurality of uplink PIM interference directions to a plurality of null portions of the of an uplink reception radiation pattern. According to another embodiment of this aspect, the scheduling restriction is configured to correspond to a mapping of at least one uplink receiving direction to a non-null portion of the uplink reception radiation pattern.

According to another embodiment of this aspect, the scheduling restriction is configured to restrict a use of at least one codeword for uplink reception based on at least one downlink codeword scheduled for use in the downlink communications. According to another embodiment of this aspect, the scheduling restriction is configured to be applied to the downlink scheduling and is based on PIM generated during uplink communications. According to another embodiment of this aspect, the scheduling restriction is configured to restrict a use of at least one downlink code word for downlink communications based on at least one uplink codeword scheduled for use in the uplink communications. According to another embodiment of this aspect, the scheduling restriction is configured to restrict at least one transmit power of at least one downlink layer in at least one direction of a PIM source and is based on scheduled uplink communication.

According to another embodiment of this aspect, the scheduling restriction corresponds to at least one Transmission Time Interval, TTI, for the second radio node based on at least one predetermined power limitations associated with the second radio node. According to another embodiment of this aspect, the scheduling restriction corresponds to a restriction on usage of at least one uplink-downlink antenna usage combination.

According to another aspect of the disclosure, a method for a first radio node for uplink and downlink co-scheduling is provided. A scheduling restriction for joint uplink and downlink scheduling is determined based on passive intermodulation, PIM, generated during simultaneous uplink and downlink communications where the uplink communications corresponds to communications from a second radio node to a first radio node. Communications according to the scheduling restriction are performed.

According to one embodiment of this aspect, PIM information indicating the PIM generated during simultaneous uplink and downlink communication is determined. According to another embodiment of this aspect, the PIM information includes at least one PIM metric for at least one combination of at least one uplink angle of arrival and at least one downlink angle of departure. According to another embodiment of this aspect, the scheduling restriction is applied to an uplink scheduling of the joint uplink and downlink scheduling, and is based on PIM generated during downlink communications.

According to another embodiment of this aspect, the scheduling restriction is configured to correspond to a mapping of at least one uplink PIM interference direction generated during downlink communications to a null portion of an uplink reception radiation pattern. According to another embodiment of this aspect, the scheduling restriction is configured to correspond to a mapping of a plurality of uplink PIM interference directions to a plurality of null portions of the of an uplink reception radiation pattern. According to another embodiment of this aspect, the scheduling restriction is configured to correspond to a mapping of at least one uplink receiving direction to a non-null portion of the uplink reception radiation pattern.

According to another embodiment of this aspect, the scheduling restriction is configured to restrict a use of at least one codeword for uplink reception based on at least one downlink codeword scheduled for use in the downlink communications. According to another embodiment of this aspect, the scheduling restriction is configured to be applied to the downlink scheduling and is based on PIM generated during uplink communications. According to another embodiment of this aspect, the scheduling restriction is configured to restrict a use of at least one downlink code word for downlink communications based on at least one uplink codeword scheduled for use in the uplink communications. According to another embodiment of this aspect, the scheduling restriction is configured to restrict at least one transmit power of at least one downlink layer in at least one direction of a PIM source and is based on scheduled uplink communication.

According to another embodiment of this aspect, the scheduling restriction corresponds to at least one Transmission Time Interval, TTI, for the second radio node based on at least one predetermined power limitations associated with the second radio node. According to another embodiment of this aspect, the scheduling restriction corresponds to a restriction on usage of at least one uplink-downlink antenna usage combination.

According to another aspect of the disclosure, a second radio node configured to operate according to an uplink and downlink co-scheduling is provided. The second radio node includes processing circuitry containing instructions executable to configure the second radio node to communicate with a first radio node according to a scheduling restriction for joint uplink and downlink scheduling that is based on passive intermodulation, PIM, generated during simultaneous uplink and downlink communications where the uplink communications corresponds to communications from the second radio node to the first radio node.

According to one embodiment of this aspect, the scheduling restriction is based on PIM information indicating the PIM generated during simultaneous uplink and downlink communication. According to another embodiment of this aspect, the PIM information includes at least one PIM metric for at least one combination of at least one uplink angle of arrival and at least one downlink angle of departure. According to another embodiment of this aspect, the scheduling restriction is configured to be applied to an uplink scheduling of the joint uplink and downlink scheduling, and is based on PIM generated during downlink communications.

According to another embodiment of this aspect, the scheduling restriction is configured to correspond to a mapping of at least one uplink PIM interference direction generated during downlink communications to a null portion of an uplink reception radiation pattern. According to another embodiment of this aspect, the scheduling restriction is configured to correspond to a mapping of a plurality of uplink PIM interference directions generated during downlink communications to a plurality of null portions of the of an uplink reception radiation pattern. According to another embodiment of this aspect, the scheduling restriction is configured to correspond to a mapping at least one uplink receiving direction to a non-null portion of the uplink reception radiation pattern.

According to another embodiment of this aspect, the scheduling restriction is configured to restrict a use of at least one codeword for uplink reception based on at least one downlink codeword scheduled for use in the downlink communications. According to another embodiment of this aspect, the scheduling restriction is configured to correspond to be applied to the downlink scheduling and is based on PIM generated during uplink communications. According to another embodiment of this aspect, the scheduling restriction is configured to correspond to restrict a use of at least one downlink code word for downlink communications based on at least one uplink codeword scheduled for use in the uplink communications.

According to another embodiment of this aspect, the scheduling restriction is configured to correspond to restrict at least one transmit power of at least one downlink layer in at least one direction of a PIM source that is based on scheduled uplink communication. According to another embodiment of this aspect, the scheduling restriction is configured to correspond to at least one Transmission Time Interval, TTI, for the second radio node based on at least one predetermined power limitations associated with the second radio node. According to another embodiment of this aspect, the scheduling restriction is configured to correspond to a restriction on usage of at least one uplink-downlink antenna usage combination.

According to another aspect of the disclosure, a method for a second radio node configured to operate according to an uplink and downlink co-scheduling is provided. Communication with a first radio node is performed according to a scheduling restriction for joint uplink and downlink scheduling that is based on passive intermodulation, PIM, generated during simultaneous uplink and downlink communications where the uplink communications corresponding to communications from the second radio node to the first radio node.

According to another embodiment of this aspect, the scheduling restriction is based on PIM information indicating the PIM generated during simultaneous uplink and downlink communication. According to another embodiment of this aspect, the PIM information includes at least one PIM metric for at least one combination of at least one uplink angle of arrival and at least one downlink angle of arrival. According to another embodiment of this aspect, the scheduling restriction is configured to be applied to an uplink scheduling of the joint uplink and downlink scheduling, and is based on PIM generated during downlink communications.

According to another embodiment of this aspect, the scheduling restriction is configured to correspond to a mapping of at least one uplink PIM interference direction generated during downlink communications to a null portion of an uplink reception radiation pattern. According to another embodiment of this aspect, the scheduling restriction is configured to correspond to a mapping of a plurality of uplink PIM interference directions generated during downlink communications to a plurality of null portions of the of an uplink reception radiation pattern. According to another embodiment of this aspect, the scheduling restriction is configured to correspond to a mapping at least one uplink receiving direction to a non-null portion of the uplink reception radiation pattern.

According to another embodiment of this aspect, the scheduling restriction is configured to restrict a use of at least one codeword for uplink reception based on at least one downlink codeword scheduled for use in the downlink communications. According to another embodiment of this aspect, the scheduling restriction is configured to correspond to be applied to the downlink scheduling and is based on PIM generated during uplink communications. According to another embodiment of this aspect, the scheduling restriction is configured to correspond to restrict a use of at least one downlink code word for downlink communications based on at least one uplink codeword scheduled for use in the uplink communications. According to another embodiment of this aspect, the scheduling restriction is configured to correspond to restrict at least one transmit power of at least one downlink layer in at least one direction of a PIM source that is based on scheduled uplink communication. According to another embodiment of this aspect, the scheduling restriction is configured to correspond to at least one Transmission Time Interval, TTI, for the second radio node based on at least one predetermined power limitations associated with the second radio node. According to another embodiment of this aspect, the scheduling restriction is configured to correspond to a restriction on usage of at least one uplink-downlink antenna usage combination.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
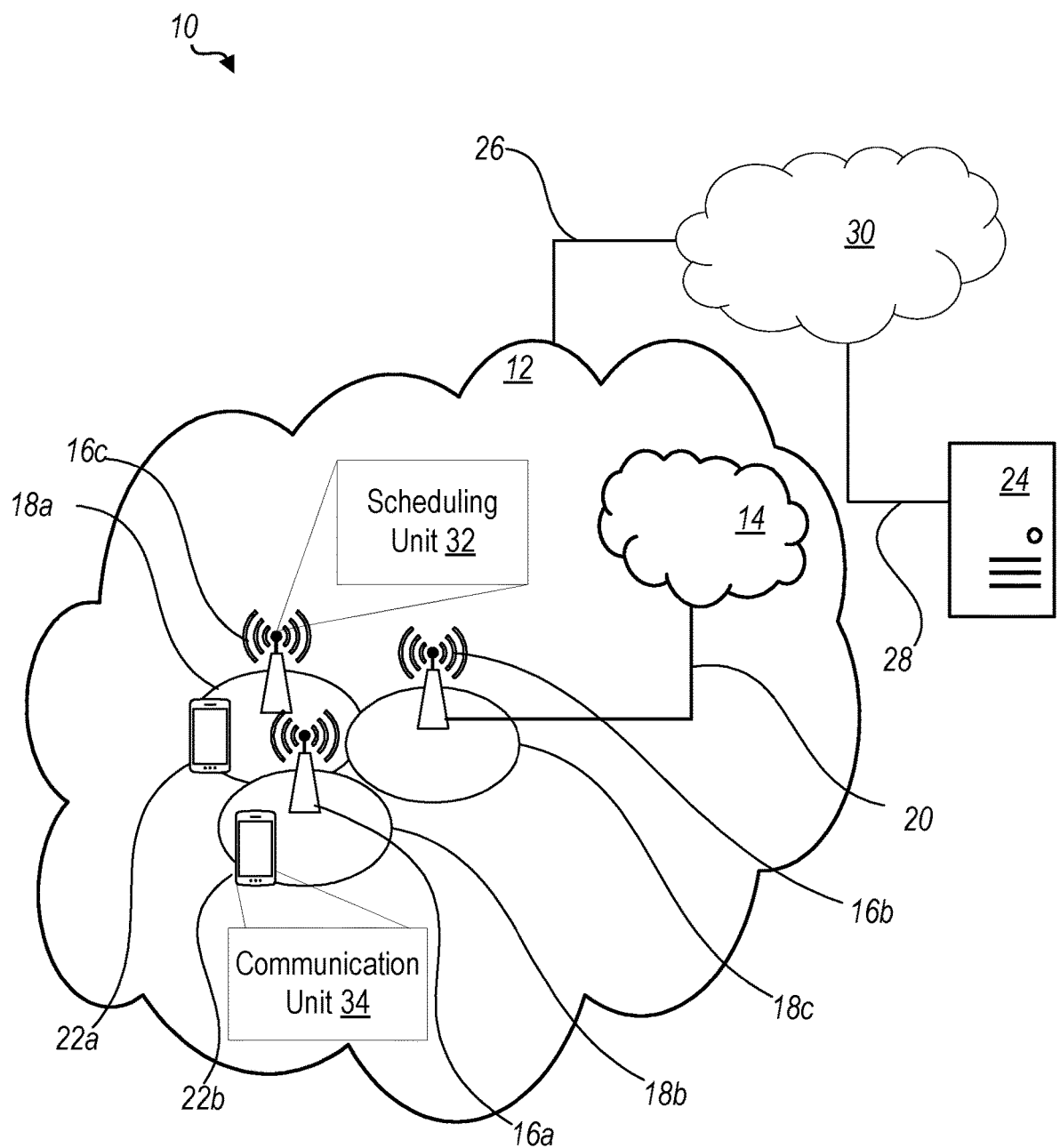
FIG. 1 is a schematic diagram of an exemplary network architecture illustrating a communication system connected via an intermediate network to a host computer according to the principles in the disclosure.

The disclosure describes methods and devices for at least partial mitigation of PIM. One of the benefits of AAS is the possibility to adapt the combined TX/RX AAS angular pattern in a relatively flexible way, forming beams, possibly in specific directions, or with specific spatial signatures as defined by codeword(s) selected from a set of allowed entries from the predefined codebook. The teachings of the disclosure advantageously exploit transmission and/or reception directivity provided by advanced antenna systems (AAS) to help at least in part mitigate passive intermodulation issues.

Before describing in detail exemplary embodiments, it is noted that the embodiments reside primarily in combinations of apparatus components and processing steps related uplink and downlink co-scheduling based on PIM awareness. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "first radio node" used herein can be any kind of radio node comprised in a radio network which may further comprise any of network node, radio base station, base station, base transceiver station (BTS), first radio node controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a user equipment (UE)/wireless device or a radio network node.

In some embodiments, the second radio node herein can be any type of radio node capable of communicating with a first radio node or another UE or wireless device over radio signals. The second radio node may also be a radio communication device, user equipment, target device, device to device (D2D) radio node, wireless device, machine type radio node or radio node capable of machine to machine communication (M2M), low-cost and/or low-complexity radio node, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc. Similarly, functions and descriptions attributed to the "first" radio node can be performed by the "second" radio node, and vice versa. In other words, in some embodiments, the "first" radio node can be the "second" radio node, and the "second" radio node can be the "first" radio node. Furthermore, the term "uplink" and "downlink" are to be understood as "from the first radio node" to the "second radio node" and "from the second radio node" to the "first radio node", respectively.

Also, in some embodiments the generic term "radio network node" is used. It can be any kind of a radio network node which may comprise any of first radio node, radio base station, base transceiver station, first radio node, first radio node controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP Long Term Evolution (LTE) and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a second radio node such as a user equipment or a first radio node such as a network node may be distributed over a plurality of second radio nodes and/or first radio nodes. In other words, it is contemplated that the functions of the first radio node and second radio node described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Returning to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of first radio nodes 16a, 16b, 16c (referred to collectively as first radio nodes 16), such as NBs, eNBs, gNBs or other types of wireless access points, each defining a corresponding coverage area 18a, 18b, 18c (referred to collectively as coverage areas 18). Each first radio node 16a, 16b, 16c is connectable to the core network 14 over a wired or wireless connection 20. A second radio node 22a located in coverage area 18a is configured to wirelessly connect to, or be paged by, the corresponding first radio node 16c. A second radio node 22b in coverage area 18b is wirelessly connectable to the corresponding first radio node 16a. While a plurality of second radio nodes 22a, 22b (collectively referred to as second radio node 22) are illustrated in this example, the disclosed embodiments are equally applicable to a situation where a sole second radio node 22 is in the coverage area or where a sole second radio node 22 is connecting to the corresponding first radio node 16. Note that although only two second radio nodes 22 and three first radio nodes 16 are shown for convenience, the communication system may include many more second radio nodes 22 and first radio nodes 16.

Also, it is contemplated that a second radio node 22 can be in simultaneous communication and/or configured to separately communicate with more than one first radio node 16 and more than one type of first radio node 16. For example, a second radio node 22 can have dual connectivity with a first radio node 16 that supports LTE and the same or a different first radio node 16 that supports NR. As an example, second radio node 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected second radio nodes 22a, 22b and the host computer 24. The connectivity may be described as an over-the-top (OTT) connection. The host computer 24 and the connected second radio nodes 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a first radio node 16 may not or need not be informed about the past routing of an incoming downlink communication with data originating from a host computer 24 to be forwarded (e.g., handed over) to a connected second radio node 22a. Similarly, the first radio node 16 need not be aware of the future routing of an outgoing uplink communication originating from the second radio node 22a towards the host computer 24.

A first radio node 16 is configured to include a scheduling unit 32 which is configured to determine and/or implement scheduling restrictions for wireless communication in accordance with the principles of the disclosure. A second radio node 22 is configured to include a communication unit 34 which is configured to perform wireless communications according to a scheduling restriction in accordance with the principles of the disclosure.

Example implementations, in accordance with an embodiment, of the second radio node 22, first radio node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a second radio node 22 connecting via an OTT connection 52 terminating at the second radio node 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the first radio node 16 and or the second radio node 22. The processing circuitry 42 of the host computer 24 may include an information unit 54 configured to enable the service provider to provide information to the first radio node 16 and/or second radio node 22 such as for determining and/or communicating scheduling restrictions described herein.

The communication system 10 further includes a first radio node 16 provided in a communication system 10 and comprising hardware 58 enabling it to communicate with the host computer 24 and with the second radio node 22. The hardware 58 may include a communication interface 60 for setting up and maintaining a wired or wireless connection with an interface of a different communication device of the communication system 10, as well as a radio interface 62 for setting up and maintaining at least a wireless connection 64 with a second radio node 22 located in a coverage area 18 served by the first radio node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the first radio node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the first radio node 16 further has software 74 stored internally in, for example, memory 72, or stored in external memory (e.g., database, storage array, network storage device, etc.) accessible by the first radio node 16 via an external connection. The software 74 may be executable by the processing circuitry 68. The processing circuitry 68 may be configured to control any of the methods and/or processes described herein and/or to cause such methods, and/or processes to be performed, e.g., by first radio node 16. Processor 70 corresponds to one or more processors 70 for performing first radio node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to first radio node 16. For example, processing circuitry 68 of the first radio node 16 may include scheduling unit 32 configured to determine and/or implement scheduling restriction(s) for wireless communications in accordance with the principles of the disclosure. In one or more embodiments, the scheduling unit 32 may be an uplink and/or downlink scheduler.

The communication system 10 further includes the second radio node 22 already referred to. The second radio node 22 may have hardware 80 that may include a radio interface 82 configured to set up and maintain a wireless connection 64 with a first radio node 16 serving a coverage area 18 in which the second radio node 22 is currently located. The radio interface 82 may be formed as or may include, for example, one or more RF transmitters, one or more RF receivers, and/or one or more RF transceivers.

The hardware 80 of the second radio node 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the second radio node 22 may further comprise software 90, which is stored in, for example, memory 88 at the second radio node 22, or stored in external memory (e.g., database, storage array, network storage device, etc.) accessible by the second radio node 22. The software 90 may be executable by the processing circuitry 84. The software 90 may include a client application 92. The client application 92 may be operable to provide a service to a human or non-human user via the second radio node 22, with the support of the host computer 24. In the host computer 24, an executing host application 50 may communicate with the executing client application 92 via the OTT connection 52 terminating at the second radio node 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by second radio node 22. The processor 86 corresponds to one or more processors 86 for performing second radio node 22 functions described herein. The second radio node 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to second radio node 22. For example, the processing circuitry 84 of the second radio node 22 may include a communication unit 34 configured to scheduling restrictions for wireless communication in accordance with the principles of the disclosure. A second radio node 22 is configured to include a communication unit 34 which is configured to perform wireless communications according to a scheduling restriction in accordance with the principles of the disclosure.

Figure 2:
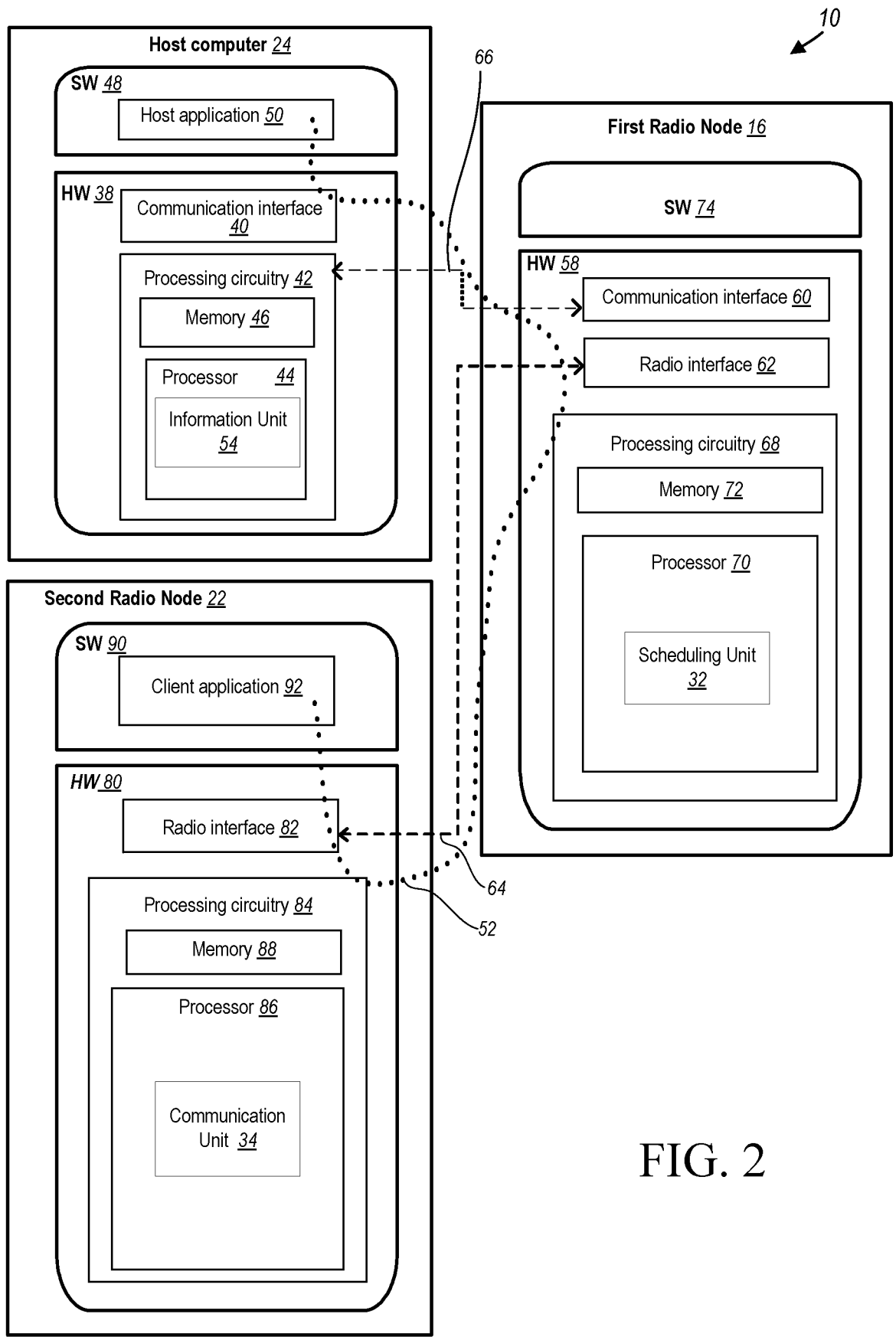
FIG. 2 is a block diagram of a host computer communicating via a first radio node with a wireless device over an at least partially wireless connection according to some embodiments of the disclosure.

In some embodiments, the inner workings of the first radio node 16, second radio node 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the second radio node 22 via the first radio node 16, without explicit reference to any intermediary devices and the precise routing of messages via these devices. Network infrastructure may determine the routing, which it may be configured to hide from the second radio node 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the second radio node 22 and the first radio node 16 is in accordance with the teachings of the embodiments described throughout this disclosure. One or more of the various embodiments improve the performance of OTT services provided to the second radio node 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and second radio node 22, in response to variations in the measurement results. The measurement procedure and/or the network functionality for reconfiguring the OTT connection 52 may be implemented in the software 48 of the host computer 24 or in the software 90 of the second radio node 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the first radio node 16, and it may be unknown or imperceptible to the first radio node 16. Some such procedures and functionalities may be known and practiced in the art. In certain embodiments, measurements may involve proprietary second radio node signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the second radio node 22. In some embodiments, the cellular network also includes the first radio node 16 with a radio interface 62. In some embodiments, the first radio node 16 is configured to, and/or the first radio node's 16 processing circuitry 68 is configured to perform the functions and/or methods described herein for preparing/initiating/maintaining/supporting/ending a transmission to the second radio node 22, and/or preparing/terminating/maintaining/supporting/ending in receipt of a transmission from the second radio node 22.

In some embodiments, the host computer 24 includes processing circuitry 42 and a communication interface 40 that is configured to a communication interface 40 configured to receive user data originating from a transmission from a second radio node 22 to a first radio node 16. In some embodiments, the second radio node 22 is configured to, and/or comprises a radio interface 82 and/or processing circuitry 84 configured to perform the functions and/or methods described herein for preparing/initiating/maintaining/supporting/ending a transmission to the first radio node 16, and/or preparing/terminating/maintaining/supporting/ending in receipt of a transmission from the first radio node 16.

Although FIGS. 1 and 2 show various "units" such as scheduling unit 32, and communication unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
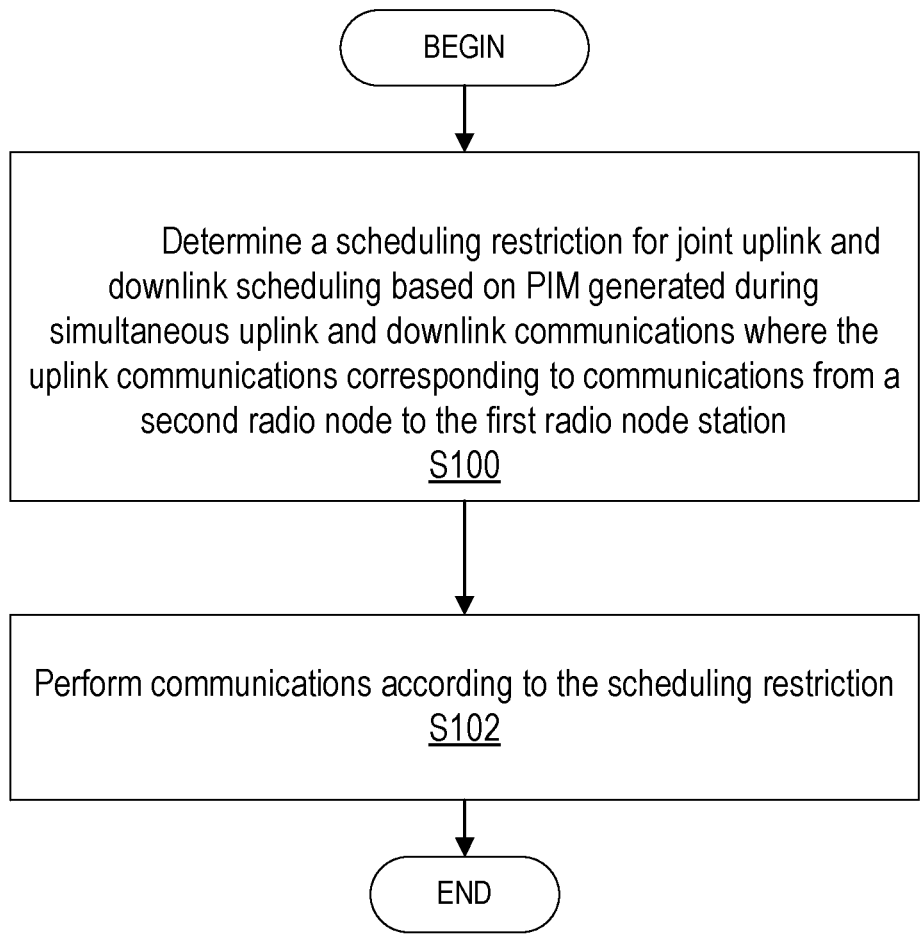
FIG. 3 is a flow diagram of an exemplary scheduling process in accordance with the principles of the disclosure.

FIG. 3 is a flowchart of an exemplary process in a first radio node 16 for determining scheduling restrictions for wireless communication in accordance with the principles of the disclosure. The first radio node 16, such as via processing circuitry 68, is configured to determine a scheduling restriction for joint uplink and downlink scheduling based on passive intermodulation, PIM, generated during simultaneous uplink and downlink communications where the uplink communications corresponds to communications from a second radio node 22 to the first radio node 16, and downlink communications correspond to communications from the first radio node 16 to the second radio node 22 (Block S100). In one or more embodiments, the determining of the scheduling restriction may include determining within the first radio node 16 or obtaining from a processing platform/first radio node, etc. external to the first radio node 16. In one or more embodiments, one or more scheduling restrictions may be determined. The first radio node 16 such as via processing circuitry 68 is configured to perform communications according to the scheduling restriction (Block S102).

According to one embodiment, the memory 72 contains further instructions executable by the processor 70 to determine information about the PIM generated during simultaneous uplink and downlink communication. According to one embodiment, the PIM information includes at least one PIM metric for at least one combination of at least one uplink angle of arrival and at least one downlink angle of departure. According to one embodiment, the scheduling restriction is applied to an uplink scheduling of the joint uplink and downlink scheduling, and is based on PIM generated during downlink communications.

According to one embodiment, the scheduling restriction is configured to correspond to a mapping of at least one uplink PIM interference direction generated during downlink communications to a null portion of an uplink reception radiation pattern. According to one embodiment, the scheduling restriction is configured to correspond to a mapping of a plurality of uplink PIM interference directions to a plurality of null portions of the of an uplink reception radiation pattern.

According to one embodiment, the scheduling restriction is configured to correspond to a mapping of at least one uplink receiving direction to a non-null portion of the uplink reception radiation pattern. According to one embodiment, the scheduling restriction is configured to restrict a use of at least one codeword for uplink reception based on at least one downlink codeword scheduled for use in the downlink communications. According to one embodiment, the scheduling restriction is configured to be applied to the downlink scheduling and is based on PIM generated during uplink communications.

According to one embodiment, the scheduling restriction is configured to restrict a use of at least one downlink code word for downlink communications based on at least one uplink codeword scheduled for use in the uplink communications. According to one embodiment, the scheduling restriction is configured to restrict at least one transmit power of at least one downlink layer in at least one direction of a PIM source and is based on scheduled uplink communication. According to one embodiment, the scheduling restriction corresponds to at least one Transmission Time Interval, TTI, for the second radio node 22 based on at least one predetermined power limitations associated with the second radio node 22. According to one embodiment of this aspect, the scheduling restriction corresponds to a restriction on usage of at least one uplink-downlink antenna usage combination.

Figure 4:
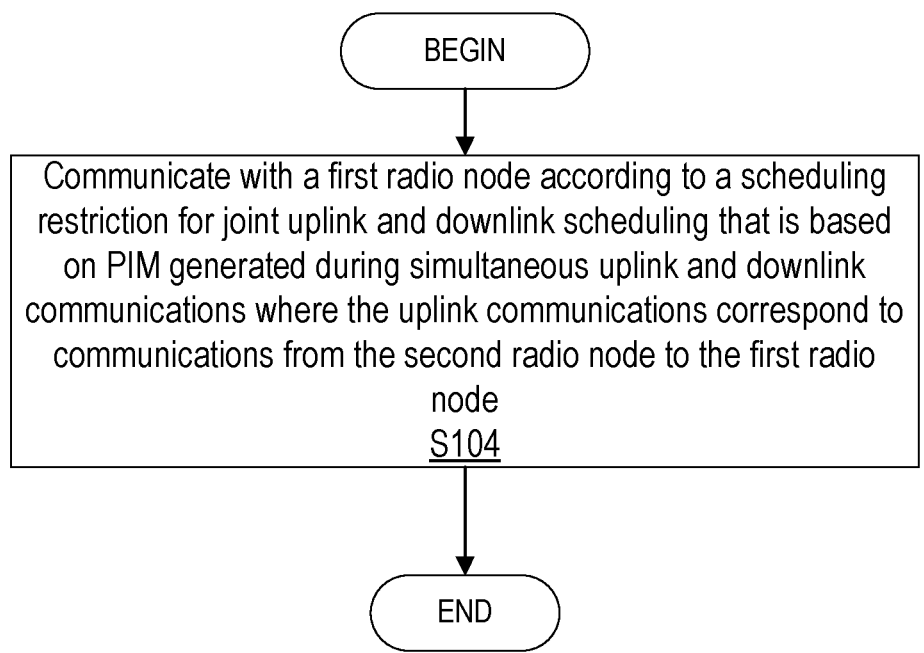
FIG. 4 is a flow diagram of an exemplary communication process in accordance with the principles of the disclosure.

FIG. 4 is a flowchart of an exemplary process in a second radio node 22 for performing wireless communications according to a scheduling restriction in accordance with the principles of the disclosure. The second radio node 22 such as via processing circuitry 84 is configured to communicate with a first radio node 16 according to a scheduling restriction for joint uplink and downlink scheduling that is based on PIM generated during simultaneous uplink and downlink communications where the uplink communications corresponding to communications from the second radio node 22 to the first radio node 16 (Block S104).

According to one embodiment, the scheduling restriction is based on PIM information indicating the PIM generated during simultaneous uplink and downlink communication. According to one embodiment, the PIM information includes at least one PIM metric for at least one combination of at least one uplink angle of arrival and at least one downlink angle of departure. According to one embodiment of this aspect, the scheduling restriction is configured to be applied to an uplink scheduling of the joint uplink and downlink scheduling, and is based on PIM generated during downlink communications.

According to one embodiment of this aspect, the scheduling restriction is configured to correspond to a mapping of at least one uplink PIM interference direction generated during downlink communications to a null portion of an uplink reception radiation pattern. According to one embodiment of this aspect, the scheduling restriction is configured to correspond to a mapping of a plurality of uplink PIM interference directions generated during downlink communications to a plurality of null portions of the of an uplink reception radiation pattern. According to one embodiment of this aspect, the scheduling restriction is configured to correspond to a mapping at least one uplink receiving direction to a non-null portion of the uplink reception radiation pattern.

According to one embodiment of this aspect, the scheduling restriction is configured to restrict a use of at least one codeword for uplink reception based on at least one downlink codeword scheduled for use in the downlink communications. According to one embodiment of this aspect, the scheduling restriction is configured to correspond to be applied to the downlink scheduling and is based on PIM generated during uplink communications. According to one embodiment of this aspect, the scheduling restriction is configured to correspond to restrict a use of at least one downlink code word for downlink communications based on at least one uplink codeword scheduled for use in the uplink communications.

According to one embodiment of this aspect, the scheduling restriction is configured to correspond to restrict at least one transmit power of at least one downlink layer in at least one direction of a PIM source that is based on scheduled uplink communication. According to one embodiment of this aspect, the scheduling restriction is configured to correspond to at least one Transmission Time Interval, TTI, for the second radio node 22 based on at least one predetermined power limitations associated with the second radio node 22. According to one embodiment of this aspect, the scheduling restriction is configured to correspond to a restriction on usage of at least one uplink-downlink antenna usage combination.

Having generally described arrangements for providing scheduling restrictions based on passive intermodulation awareness, details for these arrangements, functions and processes are provided as follows, and which may be implemented by the first radio node 16, second radio node 22 and/or host computer 24. Further, examples, embodiments and/or details will now be described.

Figure 5:
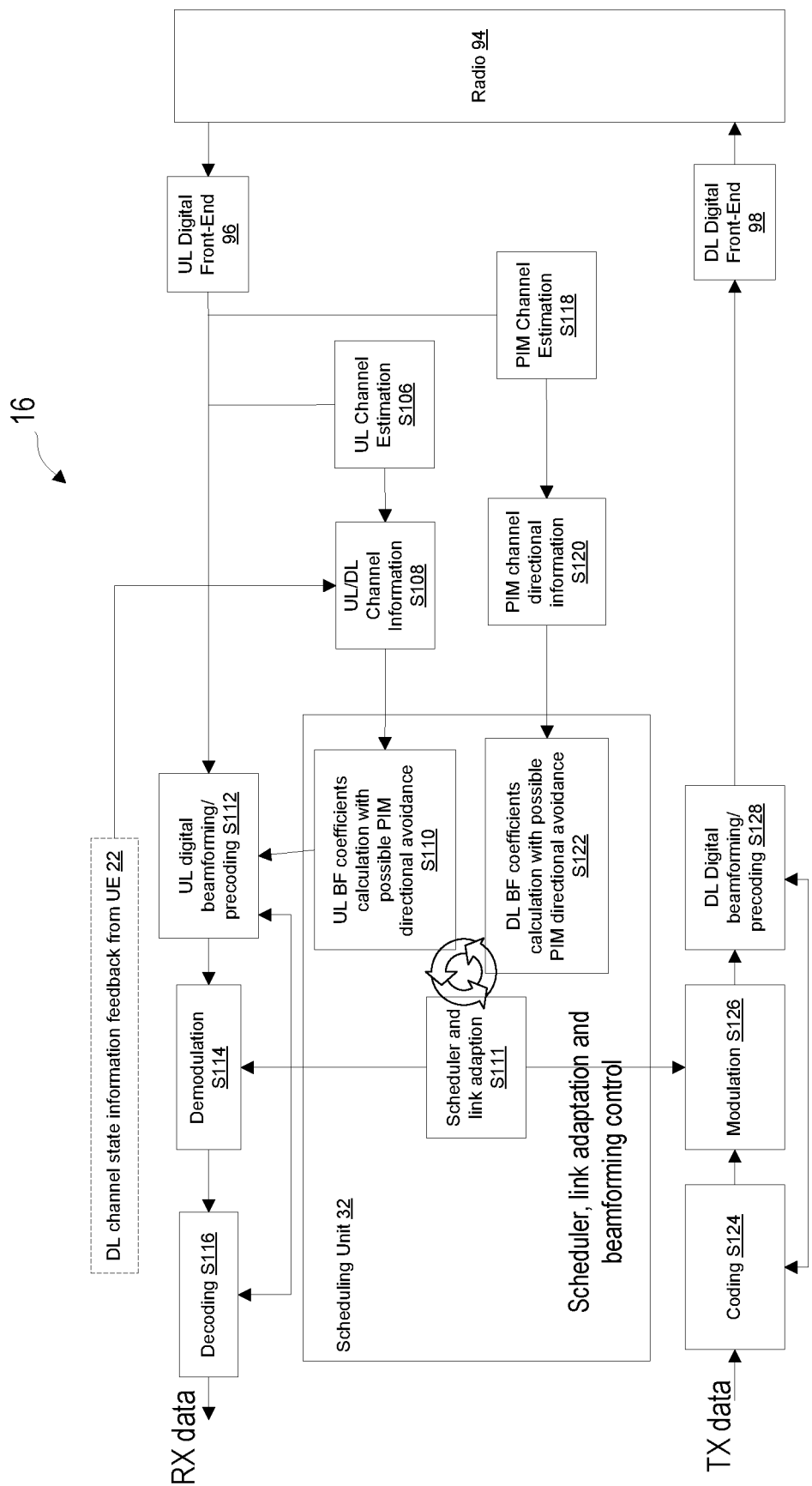
FIG. 5 is one embodiment of a portion of a first radio node in accordance with the principles of the disclosure.

FIG. 5 is another example of first radio node 16 in accordance with the principles of the disclosure. The first radio node 16 includes radio 94, uplink digital front end 96 for receiving communications from radio 94 and downlink front end 98 for providing communications to radio 94. Processing circuitry 68 is configured to estimate the uplink channel (block S106) and provide uplink and/or downlink information to scheduling unit 32 for processing as described herein such as for determining scheduling restrictions. For example, scheduling unit 32 performs uplink beamforming (BF) coefficients calculation with possible PIM directional avoidance, i.e., determines at least one scheduling restriction. Scheduling unit 32 performs scheduling and link adaptation such based on the uplink beamforming coefficients (Block S111). Processing circuitry 68 performs uplink digital beamforming/precoding based on the uplink BF coefficients (Block S112). Processing circuitry 68 performs demodulation and decoding for outputting received (RX) data (Blocks S114-S116).

The first radio node 16 also includes downlink digital front-end 98 for receiving and providing communications for transmission by radio 94. Processing circuitry 68 is configured to perform PIM channel estimation (Block S118). Processing circuitry 68 provides PIM channel directional information to scheduling unit 32 (Block S120). The estimation of the PIM channel is beyond the scope of the instant disclosure such that the disclosure assumes PIM channel estimation has occurred and that PIM channel direction information has been generated. Scheduling unit 32 performs downlink BF coefficients calculation with possible PIM directional avoidance as described herein. Scheduling unit 32 performs scheduling and link adaptation based on the downlink BF coefficient calculation (Block S111). Processing circuitry 68 is configured to performing coding on data to be transmitted (Block S124). Processing circuitry 68 is configured to perform modulation of the coded data (Block S126). Processing circuitry 68 is configured to perform downlink beamforming/precoding such as based at least in part on the downlink BF coefficients (Block S128). In one or more embodiments, the at least one scheduling restriction may correspond to one or more determined BF coefficients that may steer at least one PIM source towards a null.

In the embodiment of FIG. 5, it is assumed that a PIM channel sounding and estimation process was used, or is being used jointly, in connection with scheduling and beam control. In one or more embodiments, PIM power observed in the UL signal may be maximum for given combinations of UL AoA (angle-of-arrival), or UL codeword, and downlink (DL) AoD's (angles of departure) or DL codewords, associated with the DL carriers involved in the PIM generation. Here, it is assumed that the sounding and estimation phase has provided this PIM information. Note that in one or more embodiments the channel estimation may not necessarily need to be very precise. That is, in one embodiment, binary information related to PIM, high or low PIM, in association with some spatial TX/RX AAS conditions may be provided. Therefore, one or more embodiments described herein may assume some level of PIM channel knowledge has been received and/or determined.

In the Case of Fully Flexible Beamforming

Approach 1

Figure 6:
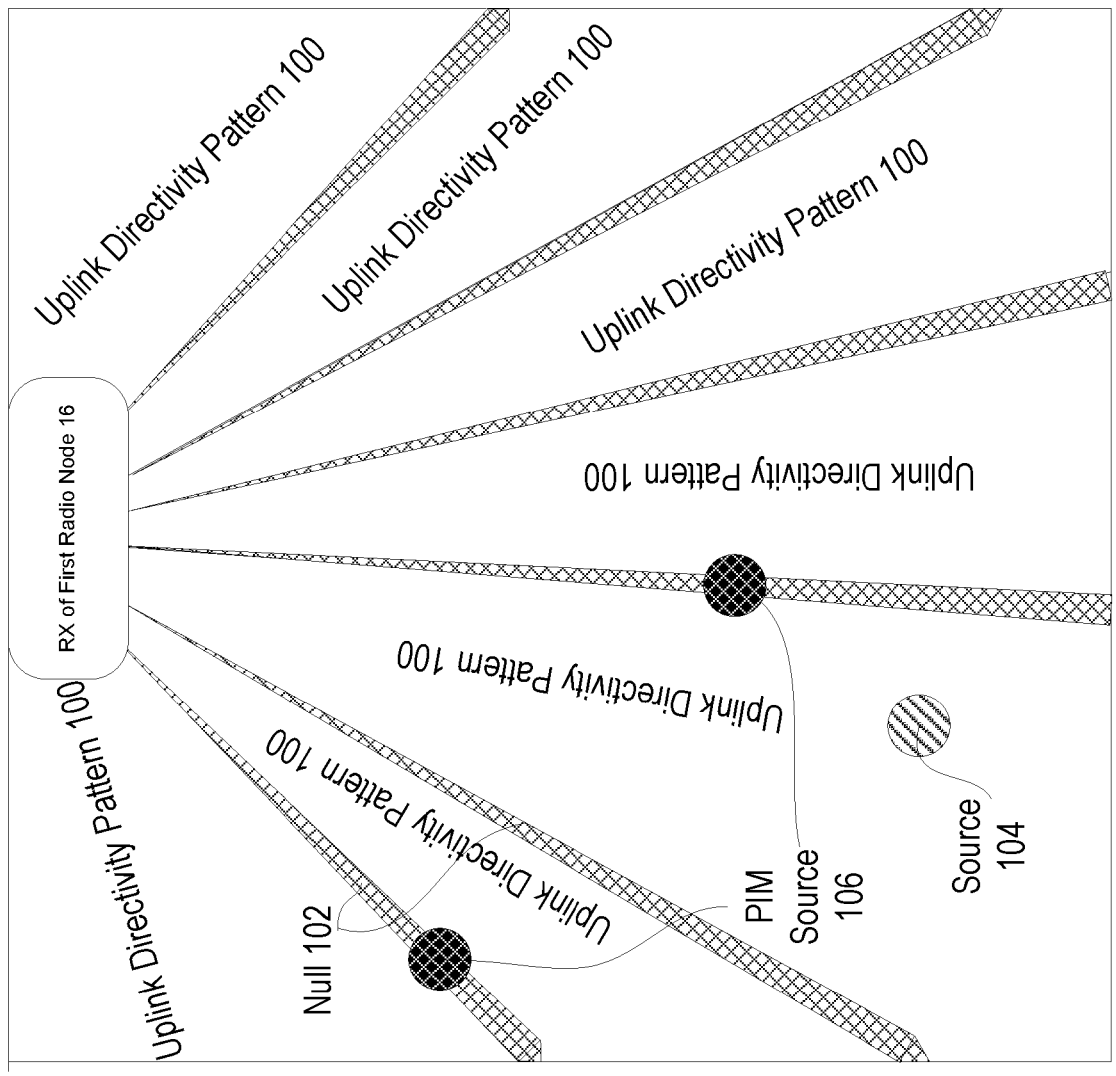
FIG. 6 is a diagram of a modified uplink directivity pattern in accordance with the principles of the disclosure.

In one or more embodiments, the UL receiver such as the radio interface 62 in second radio node 22 may be modified to effectively assume the presence of strong interference sources in the UL channel information for the directions which corresponds to the PIM UL worse AoA's. For example, the reception algorithm may be biased proactively instead of waiting for PIM to occur and the algorithm to adapt, where this approach is applicable to DL & UL. FIG. 6 illustrates an example implementing approach 1 where the uplink directivity pattern 100 may be modified to steer a null 102 in the direction from which the PIM interference is traveling in the uplink. The uplink directivity pattern 100 is located in between the nulls, where the varying intensity of certain portions within the pattern 100 have been left out for simplicity. Source 104 for uplink communications such as from a second radio node 22 that may be mapped to the intended uplink receiver direction, while PIM sources 106 with a PIM direction in the uplink that are mapped to nulls 102 or lower power portions of the uplink directivity pattern 100. In other words, the first radio node 16 determines at least one scheduling restriction that corresponds to the mapping one or more PIM sources 106 to a null 102 while mapping at least one source 104 for uplink communication to at least one intended uplink receiver direction, as shown in FIG. 6. In one or more embodiments, at least one PIM source 106 is steered towards at least one null 102 while at least one source 104 for uplink communication is steered toward an intended uplink receiver direction.

In one or more embodiments, always, or only when there are DL transmissions which are expected to create PIM (e.g., when there are DL transmissions which are expected to create PIM and approach 2, below, is not applied), may approach 1 be applied.

Approach 2. In one or more embodiments, a TX power attenuation in the directivity pattern of the DL TX layers in the directions corresponding with the PIM DL worse AoD's is provided where "worse AoDs" corresponds to AoDs meeting a predefined criteria such as meeting a predefined PIM threshold quantity. In one or more embodiments, always, or only when there is UL reception which is expected to suffer from PIM (e.g., when there are schedule UL transmissions, and approach 1, above, is not applied) may approach 2 be applied.

In one or more embodiments, one approach could be, for example, to proactively power-control the non-power-limited second radio nodes 22 which are predicted to suffer from PIM, based on transmissions to be scheduled, identify the power-limited second radio nodes 22, and schedule their UL transmissions on specific TTIs for which approach 2 above may be used, and possibly approach 1 at the same time for those TTIs, such as, in one or more embodiments, only if the DL PIM attenuation does not translate in an even worse attenuation of the desired signal (as could be the case, for example, if the PIM source corresponds to the same AoA/AoD as the best AoA/AoD for the intended signal).

In the Case of Codebook Based TX/RX:

Example 1. A UL scheduler may be part of scheduling unit 32 of the first radio node 16 and may be constrained to using/implementing codewords that are associated with smaller PIM reception. In general, the UL scheduler may perform scheduling of UL/DL communications that may be based on scheduling restrictions such as limited codewords. In one or more embodiments, the UL scheduler may always constrain or limit the use of one or more codewords or may only do so when there are DL transmissions that use DL codewords that are expected to create PIM constraint the use of one or more codewords (e.g., when there are DL transmissions which are expected to create PIM and approach 2, below, is not being applied). In other words, some UL codewords are prohibited given the set of DL codewords used or scheduled for use.

Example 2. The DL scheduler may be part of scheduling unit 32 of first radio node 16 and may constraint the use of codewords which are associated with smaller PIM reception. In one or more embodiments, the DL scheduler may always constrain or limit the use of one or more codewords or may only do so when there is UL reception which is expected to suffer from PIM (e.g., when there are schedule UL transmissions and approach 1, above is not being applied). In other words, some DL codewords are prohibited given that some UL codewords are to be used.

In one or more embodiments, example 1 and/or example 2 for codebook based TX/RX can be performed on specific TTIs for specific second radio nodes 22 based on the second radio nodes 22's predefined power limitations.

These beamforming scheduling constraints may be considered in the scheduler or scheduling unit 32 by the radio resource allocation process and the link adaptation, including power control.

Note teachings described herein that uses joint UL-DL scheduling and beam control can be generalized to also cover scheduling restrictions associated with specific antenna elements of the AAS. In particular, in addition to looking at BF directions or codewords combinations which result in PIM interference and may therefore be considered for scheduling restrictions, the teachings described herein may include looking into the use of specific antenna elements within an AAS for UL RX or DL TX, and when certain downlink-uplink (DL-UL) antenna usage combination result in PIM issues, an attempt is made to avoid certain antenna elements that are not used by the AAS for certain TTIs.

Further, irrespective of whether BF-codeword or antenna restrictions as being described herein, the teachings of the disclosure cover the multi-radio scenario, for which the multiple DL radios can interact with the UL of one (or many) of those radios, or with the UL of one (or more) other radios.

Detectability:

The scheduling of an uplink cell-edge second radio node 22 may impact the DL transmission beam pattern and the directional modification due to scheduling restriction(s) may be based on the PIM source location. Therefore, the directional modification based on the added PIM source location may be detectable by one or more over-the-air (OTA) tests that are known in the art.

In one or more embodiments, one or more PIM sources are introduced in the vicinity of the first radio node 16 to determine if the introduced PIM source(s) affect the radiation patterns given some "static" second radio node 22 conditions such as location, throughput, etc.

Some embodiments include:

A method for UL-DL co-scheduling, including applying joint TX/RX advanced antenna systems directivity pattern restrictions/modifications, so that the TX beam and or RX beam are adapted to avoid cases for which the use of the TX and RX beam combinations would result in a large PIM impact. The scheduling restrictions may not be applied independently on the TX or RX beams, but jointly, considering the simultaneous use of both the TX and RX beams.

Detectability: In one or more embodiments, one or more PIM source(s) are introduced in the environment where an interdependency between the uplink and downlink directivity pattern used is observed, which would change as the location of the PIM source(s) change.

Some other embodiments include:

According to one aspect of the disclosure, a first radio node for uplink and downlink co-scheduling is provided. The first radio node includes processing circuitry 68 including a processor 70 and a memory 72. The memory 72 contains instructions executable by the processor 70 to configure the first radio node 16 to: determine a scheduling restriction for joint uplink and downlink scheduling based on passive intermodulation, PIM, generated during simultaneous uplink and downlink communications where the uplink communications corresponds to communications from a second radio node 22 to the first radio node 16, and perform communications according to the scheduling restriction.

According to one embodiment of this aspect, the memory 72 contains further instructions executable by the processor 70 to determine information about the PIM generated during simultaneous uplink and downlink communication. According to another embodiment of this aspect, the PIM information includes at least one PIM metric for at least one combination of at least one uplink angle of arrival and at least one downlink angle of departure. According to another embodiment of this aspect, the scheduling restriction is applied to an uplink scheduling of the joint uplink and downlink scheduling, and is based on PIM generated during downlink communications.

According to another embodiment of this aspect, the scheduling restriction is configured to correspond to a mapping of at least one uplink PIM interference direction generated during downlink communications to a null portion of an uplink reception radiation pattern. According to another embodiment of this aspect, the scheduling restriction is configured to correspond to a mapping of a plurality of uplink PIM interference directions to a plurality of null portions of the of an uplink reception radiation pattern. According to another embodiment of this aspect, the scheduling restriction is configured to correspond to a mapping of at least one uplink receiving direction to a non-null portion of the uplink reception radiation pattern.

According to another embodiment of this aspect, the scheduling restriction is configured to restrict a use of at least one codeword for uplink reception based on at least one downlink codeword scheduled for use in the downlink communications. According to another embodiment of this aspect, the scheduling restriction is configured to be applied to the downlink scheduling and is based on PIM generated during uplink communications. According to another embodiment of this aspect, the scheduling restriction is configured to restrict a use of at least one downlink code word for downlink communications based on at least one uplink codeword scheduled for use in the uplink communications. According to another embodiment of this aspect, the scheduling restriction is configured to restrict at least one transmit power of at least one downlink layer in at least one direction of a PIM source and is based on scheduled uplink communication.

According to another embodiment of this aspect, the scheduling restriction corresponds to at least one Transmission Time Interval, TTI, for the second radio node 22 based on at least one predetermined power limitations associated with the second radio node 22. According to another embodiment of this aspect, the scheduling restriction corresponds to a restriction on usage of at least one uplink-downlink antenna usage combination.

According to another aspect of the disclosure, a method for a first radio node 16 for uplink and downlink co-scheduling is provided. A scheduling restriction for joint uplink and downlink scheduling is determined based on passive intermodulation, PIM, generated during simultaneous uplink and downlink communications where the uplink communications corresponds to communications from a second radio node 22 to a first radio node 16. Communications according to the scheduling restriction are performed.

According to one embodiment of this aspect, PIM information indicating the PIM generated during simultaneous uplink and downlink communication is determined. According to another embodiment of this aspect, the PIM information includes at least one PIM metric for at least one combination of at least one uplink angle of arrival and at least one downlink angle of departure. According to another embodiment of this aspect, the scheduling restriction is applied to an uplink scheduling of the joint uplink and downlink scheduling, and is based on PIM generated during downlink communications.

According to another embodiment of this aspect, the scheduling restriction is configured to correspond to a mapping of at least one uplink PIM interference direction generated during downlink communications to a null portion of an uplink reception radiation pattern. According to another embodiment of this aspect, the scheduling restriction is configured to correspond to a mapping of a plurality of uplink PIM interference directions to a plurality of null portions of the of an uplink reception radiation pattern. According to another embodiment of this aspect, the scheduling restriction is configured to correspond to a mapping of at least one uplink receiving direction to a non-null portion of the uplink reception radiation pattern.

According to another embodiment of this aspect, the scheduling restriction is configured to restrict a use of at least one codeword for uplink reception based on at least one downlink codeword scheduled for use in the downlink communications. According to another embodiment of this aspect, the scheduling restriction is configured to be applied to the downlink scheduling and is based on PIM generated during uplink communications. According to another embodiment of this aspect, the scheduling restriction is configured to restrict a use of at least one downlink code word for downlink communications based on at least one uplink codeword scheduled for use in the uplink communications. According to another embodiment of this aspect, the scheduling restriction is configured to restrict at least one transmit power of at least one downlink layer in at least one direction of a PIM source and is based on scheduled uplink communication.

According to another embodiment of this aspect, the scheduling restriction corresponds to at least one Transmission Time Interval, TTI, for the second radio node 22 based on at least one predetermined power limitations associated with the second radio node 22. According to another embodiment of this aspect, the scheduling restriction corresponds to a restriction on usage of at least one uplink-downlink antenna usage combination.

According to another aspect of the disclosure, a second radio node 22 configured to operate according to an uplink and downlink co-scheduling is provided. The second radio node 22 includes processing circuitry 84 where the processing circuitry 84 including a processor 86 and a memory 88. The memory 88 contains instructions executable by the processor 86 to configure the second radio node 22 to communicate with a first radio node 16 according to a scheduling restriction for joint uplink and downlink scheduling that is based on passive intermodulation, PIM, generated during simultaneous uplink and downlink communications where the uplink communications corresponds to communications from the second radio node 22 to the first radio node 16.

According to one embodiment of this aspect, the scheduling restriction is based on PIM information indicating the PIM generated during simultaneous uplink and downlink communication. According to another embodiment of this aspect, the PIM information includes at least one PIM metric for at least one combination of at least one uplink angle of arrival and at least one downlink angle of departure. According to another embodiment of this aspect, the scheduling restriction is configured to be applied to an uplink scheduling of the joint uplink and downlink scheduling, and is based on PIM generated during downlink communications.

According to another embodiment of this aspect, the scheduling restriction is configured to correspond to a mapping of at least one uplink PIM interference direction generated during downlink communications to a null portion of an uplink reception radiation pattern. According to another embodiment of this aspect, the scheduling restriction is configured to correspond to a mapping of a plurality of uplink PIM interference directions generated during downlink communications to a plurality of null portions of the of an uplink reception radiation pattern. According to another embodiment of this aspect, the scheduling restriction is configured to correspond to a mapping at least one uplink receiving direction to a non-null portion of the uplink reception radiation pattern.

According to another embodiment of this aspect, the scheduling restriction is configured to restrict a use of at least one codeword for uplink reception based on at least one downlink codeword scheduled for use in the downlink communications. According to another embodiment of this aspect, the scheduling restriction is configured to correspond to be applied to the downlink scheduling and is based on PIM generated during uplink communications. According to another embodiment of this aspect, the scheduling restriction is configured to correspond to restrict a use of at least one downlink code word for downlink communications based on at least one uplink codeword scheduled for use in the uplink communications.

According to another embodiment of this aspect, the scheduling restriction is configured to correspond to restrict at least one transmit power of at least one downlink layer in at least one direction of a PIM source that is based on scheduled uplink communication. According to another embodiment of this aspect, the scheduling restriction is configured to correspond to at least one Transmission Time Interval, TTI, for the second radio node 22 based on at least one predetermined power limitations associated with the second radio node 22. According to another embodiment of this aspect, the scheduling restriction is configured to correspond to a restriction on usage of at least one uplink-downlink antenna usage combination.

According to another aspect of the disclosure, a method for a second radio node 22 configured to operate according to an uplink and downlink co-scheduling is provided. Communication with a first radio node is performed according to a scheduling restriction for joint uplink and downlink scheduling that is based on passive intermodulation, PIM, generated during simultaneous uplink and downlink communications where the uplink communications corresponding to communications from the second radio node 22 to the first radio node 16.

According to another embodiment of this aspect, the scheduling restriction is based on PIM information indicating the PIM generated during simultaneous uplink and downlink communication. According to another embodiment of this aspect, the PIM information includes at least one PIM metric for at least one combination of at least one uplink angle of arrival and at least one downlink angle of arrival. According to another embodiment of this aspect, the scheduling restriction is configured to be applied to an uplink scheduling of the joint uplink and downlink scheduling, and is based on PIM generated during downlink communications.

According to another embodiment of this aspect, the scheduling restriction is configured to correspond to a mapping of at least one uplink PIM interference direction generated during downlink communications to a null portion of an uplink reception radiation pattern. According to another embodiment of this aspect, the scheduling restriction is configured to correspond to a mapping of a plurality of uplink PIM interference directions generated during downlink communications to a plurality of null portions of the of an uplink reception radiation pattern. According to another embodiment of this aspect, the scheduling restriction is configured to correspond to a mapping at least one uplink receiving direction to a non-null portion of the uplink reception radiation pattern.

According to another embodiment of this aspect, the scheduling restriction is configured to restrict a use of at least one codeword for uplink reception based on at least one downlink codeword scheduled for use in the downlink communications. According to another embodiment of this aspect, the scheduling restriction is configured to correspond to be applied to the downlink scheduling and is based on PIM generated during uplink communications. According to another embodiment of this aspect, the scheduling restriction is configured to correspond to restrict a use of at least one downlink code word for downlink communications based on at least one uplink codeword scheduled for use in the uplink communications. According to another embodiment of this aspect, the scheduling restriction is configured to correspond to restrict at least one transmit power of at least one downlink layer in at least one direction of a PIM source that is based on scheduled uplink communication. According to another embodiment of this aspect, the scheduling restriction is configured to correspond to at least one Transmission Time Interval, TTI, for the second radio node 22 based on at least one predetermined power limitations associated with the second radio node 22. According to another embodiment of this aspect, the scheduling restriction is configured to correspond to a restriction on usage of at least one uplink-downlink antenna usage combination.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A first radio node for uplink and downlink co-scheduling, the first radio node comprising processing circuitry containing instructions executable to configure the first radio node to:
   determine information about passive intermodulation (PIM) generated during simultaneous uplink and downlink communication, wherein the PIM information includes at least one PIM metric for at least one combination of at least one uplink angle of arrival and at least one downlink angle of departure;
   determine a scheduling restriction for joint uplink and downlink scheduling based on the PIM generated during simultaneous uplink and downlink communications, the uplink communications corresponding to communications from a second radio node to the first radio node; and
   perform communications according to the scheduling restriction,
   wherein the scheduling restriction is configured to restrict a use of at least one codeword for uplink reception based on at least one downlink codeword scheduled for use in the downlink communications or restrict a use of at least one downlink code word for downlink communications based on at least one uplink codeword scheduled for use in the uplink communications.

2. The first radio node of claim 1, wherein the scheduling restriction is applied to an uplink scheduling of the joint uplink and downlink scheduling, and is based on PIM generated during downlink communications.

3. The first radio node of claim 1, wherein the scheduling restriction is configured to correspond to a mapping of at least one uplink PIM interference direction generated during downlink communications to a null portion of an uplink reception radiation pattern or wherein the scheduling restriction is configured to correspond to a mapping of a plurality of uplink PIM interference directions to a plurality of null portions of the of an uplink reception radiation pattern, and wherein the scheduling restriction is optionally configured to correspond to a mapping of at least one uplink receiving direction to a non-null portion of the uplink reception radiation pattern.

4. The first radio node of claim 1, wherein the scheduling restriction is configured to be applied to the downlink scheduling and is based on PIM generated during uplink communications.

5. The first radio node of claim 1, wherein the scheduling restriction is configured to restrict at least one transmit power of at least one downlink layer in at least one direction of a PIM source and is based on scheduled uplink communication.

6. The first radio node of claim 1, wherein the scheduling restriction corresponds to: at least one Transmission Time Interval (TTI) for the second radio node based on at least one predetermined power limitations associated with the second radio node, or a restriction on usage of at least one uplink-downlink antenna usage combination.

7. A method for a first radio node for uplink and downlink co-scheduling, the method comprising:
   determining information about passive intermodulation (PIM) generated during simultaneous uplink and downlink communication, wherein the PIM information includes at least one PIM metric for at least one combination of at least one uplink angle of arrival and at least one downlink angle of departure;
   determining a scheduling restriction for joint uplink and downlink scheduling based on the PIM generated during simultaneous uplink and downlink communications, the uplink communications corresponding to communications from a second radio node to the first radio node; and
   performing communications according to the scheduling restriction,
   wherein the scheduling restriction is configured to restrict a use of at least one codeword for uplink reception based on at least one downlink codeword scheduled for use in the downlink communications or restrict a use of at least one downlink code word for downlink communications based on at least one uplink codeword scheduled for use in the uplink communications.

8. A second radio node configured to operate according to an uplink and downlink co-scheduling, the second radio node comprising:
   processing circuitry, the processing circuitry containing instructions executable to configure the second radio node to communicate with a first radio node according to a scheduling restriction for joint uplink and downlink scheduling that is based on passive intermodulation (PIM) generated during simultaneous uplink and downlink communications, the uplink communications corresponding to communications from the second radio node to the first radio node, wherein the scheduling restriction is based on PIM information indicating the PIM generated during simultaneous uplink and downlink communication, and wherein optionally the PIM information includes at least one PIM metric for at least one combination of at least one uplink angle of arrival and at least one downlink angle of departure, and wherein the scheduling restriction is configured to restrict a use of at least one codeword for uplink reception based on at least one downlink codeword scheduled for use in the downlink communications or restrict use of at least one downlink codeword for downlink communications based on at least one uplink codeword scheduled for use in the uplink communications.

9. The second radio node of claim 8, wherein the scheduling restriction is configured to be applied to an uplink scheduling of the joint uplink and downlink scheduling, and is based on PIM generated during downlink communications.

10. The second radio node of claim 8, wherein the scheduling restriction is configured to: correspond to a mapping of at least one uplink PIM interference direction generated during downlink communications to a null portion of an uplink reception radiation pattern, or a plurality of uplink PIM interference directions generated during downlink communications to a plurality of null portions of an uplink reception radiation pattern, or a mapping at least one uplink receiving direction to a non-null portion of the uplink reception radiation pattern.

11. The second radio node of claim 8, wherein the scheduling restriction is configured to correspond to be applied to the downlink scheduling and is based on PIM generated during uplink communications.

12. The second radio node of claim 8, wherein the scheduling restriction is configured to correspond to restrict at least one transmit power of at least one downlink layer in at least one direction of a PIM source that is based on scheduled uplink communication.

13. The second radio node of claim 8, wherein the scheduling restriction is configured to correspond to at least one Transmission Time Interval (TTI) for the second radio node based on at least one predetermined power limitations associated with the second radio node.

14. The second radio node of claim 8, wherein the scheduling restriction is configured to correspond to a restriction on usage of at least one uplink-downlink antenna usage combination.

15. A method for a second radio node configured to operate according to an uplink and downlink co-scheduling, the method comprising:
   communicating with a first radio node according to a scheduling restriction for joint uplink and downlink scheduling that is based on passive intermodulation (PIM) generated during simultaneous uplink and downlink communications, the uplink communications corresponding to communications from the second radio node to the first radio node, wherein the scheduling restriction is based on PIM information indicating the PIM generated during simultaneous uplink and downlink communication, and wherein optionally the PIM information includes at least one PIM metric for at least one combination of at least one uplink angle of arrival and at least one downlink angle of departure, wherein the scheduling restriction is configured to restrict a use of at least one codeword for uplink reception based on at least one downlink codeword scheduled for use in the downlink communications or restrict use of at least one downlink codeword for downlink communications based on at least one uplink codeword scheduled for use in the uplink communications.

* * * * *